(12) United States Patent
Huang et al.

(10) Patent No.: US 11,216,049 B2
(45) Date of Patent: Jan. 4, 2022

(54) BUS SYSTEM

(71) Applicant: Nuvoton Technology Corporation, Hsinchu (TW)

(72) Inventors: Chih-Hung Huang, New Taipei (TW); Chun-Wei Chiu, New Taipei (TW); Hao-Yang Chang, Houlong Township, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 19 days.

(21) Appl. No.: 16/713,745

(22) Filed: Dec. 13, 2019

(65) Prior Publication Data

US 2020/0192449 A1 Jun. 18, 2020

(30) Foreign Application Priority Data

Dec. 13, 2018 (TW) .................................. 107144994

(51) Int. Cl.
*G06F 1/26* (2006.01)
*G06F 13/20* (2006.01)
*G06F 13/42* (2006.01)

(52) U.S. Cl.
CPC .............. *G06F 1/266* (2013.01); *G06F 13/20* (2013.01); *G06F 13/4291* (2013.01)

(58) Field of Classification Search
CPC .............. G06F 13/362; G06F 13/4291; G06F 13/4022; G06F 13/4282; G06F 21/85; G06F 21/606; G06F 13/4068

(Continued)

(56) References Cited

U.S. PATENT DOCUMENTS 5,081,701 A * 1/1992 Silver .................. G06F 13/423
710/105
5,765,217 A * 6/1998 Moyer ................ G06F 13/4217
710/100

(Continued)

FOREIGN PATENT DOCUMENTS

| CN | 104541473 B | 9/2017 |
|---|---|---|
| CN | 104969206 B | 12/2017 |
| TW | I671638 B | 9/2019 |

OTHER PUBLICATIONS

Office Action dated Jan. 17, 2020 in corresponding TW Application No. 107144994.

*Primary Examiner* — Faisal M Zaman
(74) *Attorney, Agent, or Firm* — Muncy, Geissler, Olds and Lowe, P.C.

(57) ABSTRACT

A bus system is provided. The bus system includes a master device and a plurality of slave devices electrically connected to the master device. Each slave device has an alert handshake pin. The alert handshake pins of the slave devices are electrically connected together via an alert handshake control line. When the alert handshake control line is at a first voltage level and a first slave device want to communicate with the master device, the first slave device controls the alert handshake control line to a second voltage level via the alert handshake pin, such that the slave devices enter a synchronization stage. Among phases of each assignment period, in a first phase corresponding to the first slave device, the first slave device controls the alert handshake control line to the second voltage level via the alert handshake pin.

10 Claims, 6 Drawing Sheets

(58) Field of Classification Search
USPC .................... 710/10, 104, 105, 110, 14, 8
See application file for complete search history.

(56) References Cited

U.S. PATENT DOCUMENTS

| | | | | |
|---|---|---|---|---|
| 6,807,593 | B1* | 10/2004 | Moss | G06F 13/36 |
| | | | | 710/110 |
| 8,190,803 | B2* | 5/2012 | Hobson | G06F 13/1657 |
| | | | | 710/120 |
| 2010/0153602 | A1* | 6/2010 | Kume | G06F 13/4226 |
| | | | | 710/110 |
| 2011/0106991 | A1* | 5/2011 | Takayuki | G06F 13/4217 |
| | | | | 710/110 |
| 2013/0322462 | A1* | 12/2013 | Poulsen | H04J 3/06 |
| | | | | 370/458 |
| 2014/0112339 | A1* | 4/2014 | Safranek | G06F 13/4282 |
| | | | | 370/389 |
| 2017/0153997 | A1* | 6/2017 | Chiu | G06F 13/404 |

* cited by examiner

BUS SYSTEM

CROSS-REFERENCE TO RELATED APPLICATION

This application claims the benefit of Taiwan Patent Application No. 107144994, filed on Dec. 13, 2018, in the Taiwan Intellectual Property Office, the disclosure of which is incorporated herein in its entirety by reference.

BACKGROUND OF THE INVENTION

1. Field of the Invention

The present invention relates to a bus system, and more particularly to a bus system comprising a plurality of slave devices.

2. Description of the Related Art

In a conventional computer system, a chip set such as a south bridge chip is electrically connected to the other external circuit module (such as a system-on-a-chip (SoC) with various functions) through a low pin count (LPC) interface. The external circuit modules coupled through the LPC interface are assigned to different and independent addresses respectively. As a result, the south bridge chip can perform communication with the external circuit modules by a one-to-many way. However, in recent years, an aspect of the new bus architectures, such as an enhanced serial peripheral interface (eSPI) bus, began only allowing a one-to-one communication mechanism to be employed between the chip set and the external circuit modules.

Therefore, a scheme capable of scheduling a plurality of circuit modules of a bus is desirable.

SUMMARY OF THE INVENTION

An objective of the present invention is to provide a bus system to solve above-mentioned problem.

In order to achieve the objective, the present invention provides a bus system including a master device, a bus, and a plurality of slave devices. The slave devices are electrically connected to the master device via the bus. Each of the plurality of slave devices comprises an alert handshake pin, and the alert handshake pins of the plurality of slave devices are electrically connected with each other via an alert handshake control line. When the alert handshake control line is at a first voltage level and a first slave device of the plurality of slave devices wants to communicate with the master device via the bus, the first slave device controls the alert handshake control line to be at a second voltage level via the alert handshake pin, to make the plurality of slave devices enter a synchronization stage. When the first slave device is in in an assignment stage and in communication with the master device via the bus, in a first phase of phases of each assignment period of the assignment stage corresponding to the first slave device, the first slave device controls the alert handshake control line to be at the second voltage level via the alert handshake pin, and the first slave device controls the alert handshake control line to be at the first voltage level via the alert handshake pin in the phases other than the first phase in the assignment period. A number of clock cycles of each of the phases is less than a number of the clock cycles of the assignment stage.

According to an embodiment, in the phase other than the first phase in each assignment period, the first slave device detects the voltage level of the alert handshake control line to determine whether the master device is in communication with one of the plurality of slave devices.

According to an embodiment, when a second slave device of the slave device detects, in the first phase of each assignment period, that the alert handshake control line is at the second voltage level, the second slave device determines that the master device is communicating with the first slave device.

According to an embodiment, when the second slave device detects that the alert handshake control line is at the first voltage level in the phases of each assignment period, the second slave device determines that the master device is not in communication with the plurality of slave device.

According to an embodiment, in a synchronization end stage between the synchronization stage and the assignment stage, the first slave device controls the alert handshake control line to be at the first voltage level via the alert handshake pin, wherein a number of clock cycles of the synchronization end stage is less than a number of clock cycles of each of the phases by at least one clock cycle.

According to an embodiment, in each assignment period, a number of the phases is equal to a number of the plurality of slave devices.

According to an embodiment, the bus system further comprises a pull-up resistor coupled to the alert handshake control line, and the second voltage level is a low voltage level, and the first voltage level is a high voltage level.

In order to achieve the objective, the present invention provides a bus system comprising a master device, a bus, and a plurality of slave devices. The slave devices are electrically connected to the master device via the bus. Each slave device comprises an alert handshake pin, and the alert handshake pins of the plurality of slave devices are electrically connected to a pull-up resistor via an alert handshake control line. When the alert handshake control line is at a first voltage level and a first slave device of the plurality of slave devices wants to communicate with the master device via the bus, the first slave device controls the alert handshake control line to be at a second voltage level via the alert handshake pin, so as to make the plurality of slave devices enter a synchronization stage. Each of plurality of slave devices detects the voltage level of the alert handshake control line in the phases of each assignment period of an assignment stage other than the phase corresponding thereto, so as to determine whether the master device is in communication with one of the plurality of slave devices. In each assignment period, a number of the phases is equal to a number of the plurality of slave devices.

According to an embodiment, when the first slave device is in communication with the master device via the bus, the first slave device drives the alert handshake control line via the alert handshake pin in a first phase corresponding to the first slave device in each assignment period, to make the alert handshake control line at the second voltage level, so as to notice the other of the plurality of slave devices that the master device is in communication with the first slave device.

According to an embodiment, in the phase other than the first phase in each assignment period, the alert handshake control line is at the first voltage level, and each of the phases comprise two clock cycles. In a synchronization end stage between the synchronization stage and the assignment stage, the first slave device controls the alert handshake control line to be at the first voltage level via the alert handshake pin, wherein a number of clock cycles of the synchronization stage is less than a number of clock cycles of each of the phases.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
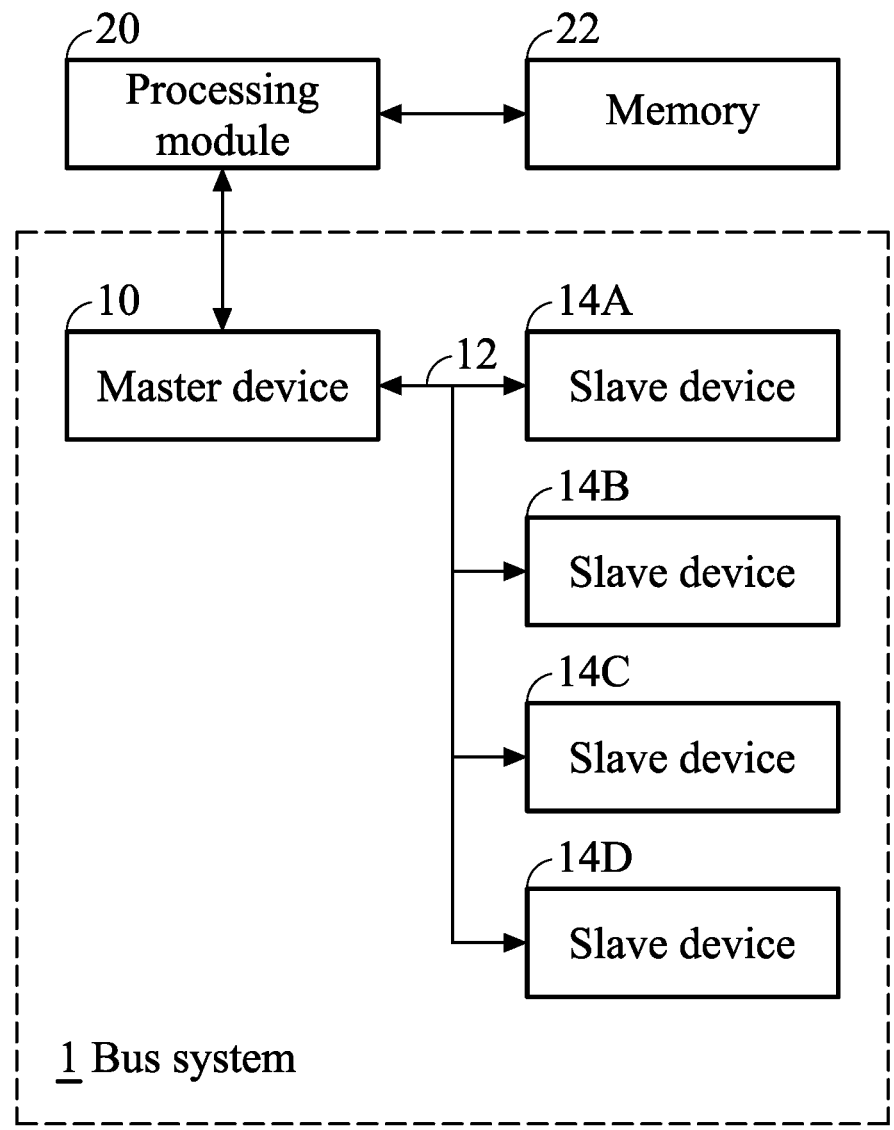
FIG. 1 is a schematic diagram of an embodiment of a bus system of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

FIG. 1 is a schematic diagram of an embodiment of a bus system 1 of the present invention. The bus system 1 can include a master device 10, a bus 12, and a plurality of slave devices 14A to 14D. In some embodiments, the master device 10 can be a south bridge chip. In some embodiments, the master device 10 is electrically connected to a processing module 20 of a computer system, which is not shown in figures, so as to facilitate to perform corresponding instruction of the processing module 20 for accessing data via the bus 12 and the slave devices 14A to 14D. In some embodiments, the processing module 20 can be electrically connected to a memory 22 of a computer system, to facilitate to access the memory 22 upon requirements of different applications. In some embodiments, the bus 12 can be an enhanced serial peripheral interface bus. The master device 10 is electrically connected to the slave devices 14A to 14D, via the bus 12. Furthermore, the master device 10 can be in communication with the slave devices 14A to 14D based on a one-to-one communication mechanism, and the slave devices 14A to 14D can communicate with the master device 10 according to an arbitration mechanism. It should be noted that a number of the slave devices 14A to 14D is merely an example but the present invention is not limited thereto.

Figure 2:
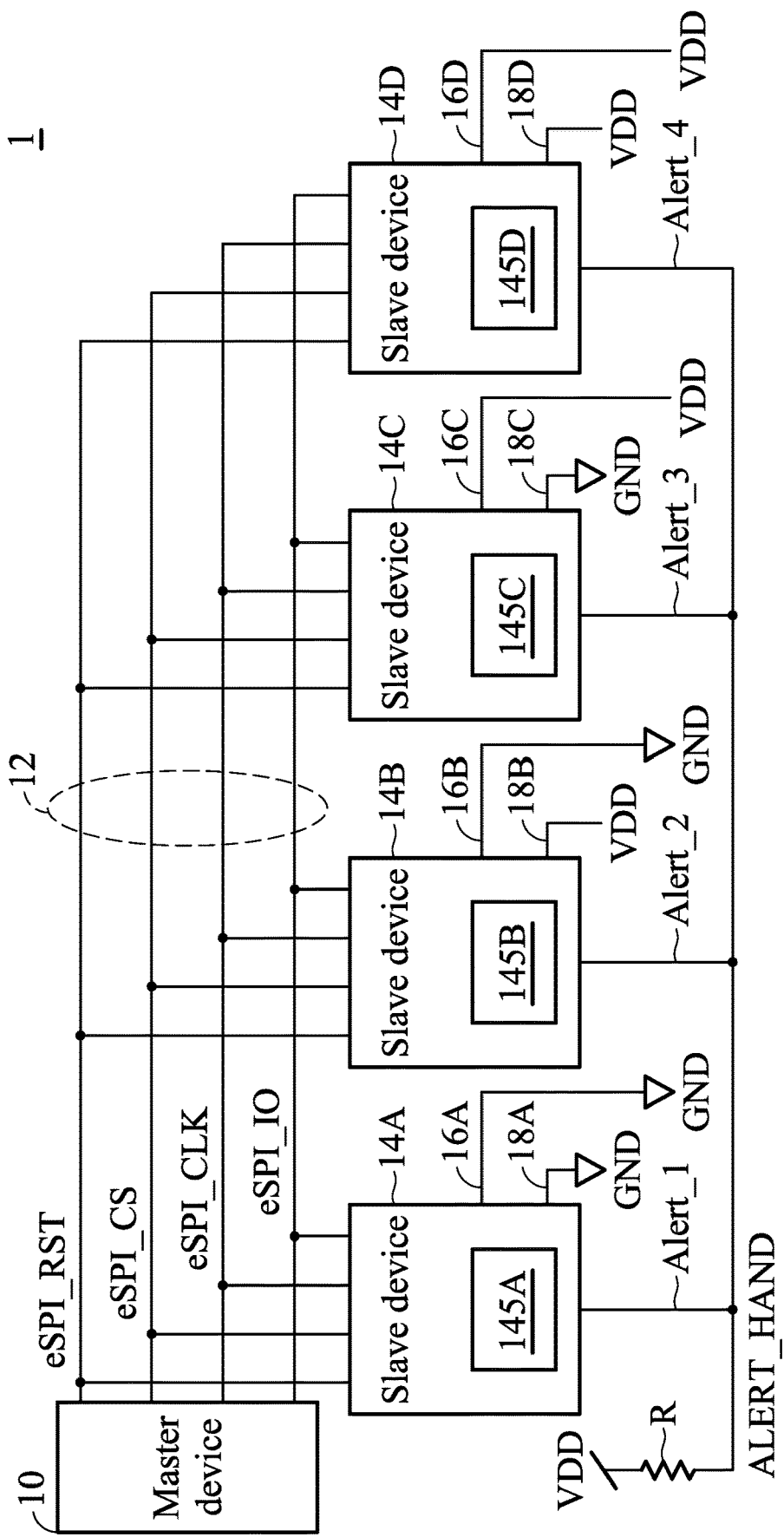
FIG. 2 is a connection configuration diagram of the embodiment of the bus system of FIG. 1.

FIG. 2 shows a connection configuration diagram of the embodiment of the bus system 1 of FIG. 1 according to the present invention. In the embodiment, the bus 12 can comprise a reset signal line eSPI_RST, a chip select signal line eSPI_CS, a clock signal eSPI_CLK and an input/output signal line eSPI_IO. The master device 10 can be in communication with the slave devices 14A to 14D via a chip select signal line eSPI_CS based on one-to-one communication mechanism. Furthermore, based on the arbitration mechanism, the slave devices 14A to 14D can communicate with the master device 10 for data and instruction transmission, via the input/output signal line eSPI_IO. When the master device 10 is in communication with one of the slave devices 14A to 14D via the bus 12, the clock signal eSPI_CLK can serve as a reference clock.

In general, according to operation mechanism of the chip select signal line eSPI_CS, the master device 10 is permitted to only select single device for communication. However, according to the arbitration mechanism, in the bus system 1, only one of the slave devices 14A to 14D can respond to the master device 10 in single time slot. When the master device 10 is operated in one-to-one communication mechanism, the bus 12 can connect one the slave devices 14A to 14D corresponding to the chip select signal line eSPI_CS for communication, thereby improving expandability of the bus system 1.

As shown in FIG. 2, the slave devices 14A to 14D comprise address section selection pins 18A to 18D, address entry selection pins 16A to 16D and alert handshake pins Alert_1 to Alert_4, respectively. The address corresponding to each of the slave devices 14A to 14D can be assigned according to a combination of voltage levels received by the address section selection pins 18A to 18D and the address entry selection pins 16A to 16D, so that the slave devices 14A to 14D can have different address sections from each other. For example, the address section selection pins 18A and 18C of the slave device 14A and 14C are coupled to ground GND, to correspond to the first address section. The address entry selection pins 16A and 16C of the slave devices 14A and 14C are coupled to ground GND and power source VDD, respectively, to correspond different address entry codes, such as a first address and a second address of the first address section. Furthermore, the address section selection pins 18B and 18D of the slave device 14B and 14D are coupled to the power source VDD, to correspond to the second address section. The address entry selection pins 16B and 16D of the slave devices 14B and 14D are coupled to ground GND and power source VDD, respectively, to correspond different address entry codes, such as a first address and a second address of the second address section.

The alert handshake pins Alert_1 to Alert_4 of the slave devices 14A to 14D are electrically connected to the alert handshake control line ALERT_HAND. In the embodiment, the alert handshake control line ALERT_HAND is electrically connected to power source VDD via a pull-up resistor R, so that the alert handshake control line ALERT_HAND can be at a high voltage level, such as a high logic signal "H". Furthermore, scheduling controllers 145A to 145D of the slave devices 14A to 14D can control the alert handshake pins Alert_1 to Alert_4 corresponding thereto to be a low voltage level, such as a low logic signal "L", for driving the alert handshake control line ALERT_HAND, so that the alert handshake control line ALERT_HAND can be at the low voltage level. Each of the slave devices 14A to 14D can control the voltage level of the alert handshake control line ALERT_HAND, to get the right to actively communicate with the master device 10. Each of the alert handshake pins Alert_1 to Alert_4 is a bi-directional input/output pin, and is in open drain under an output mode.

Figure 3:
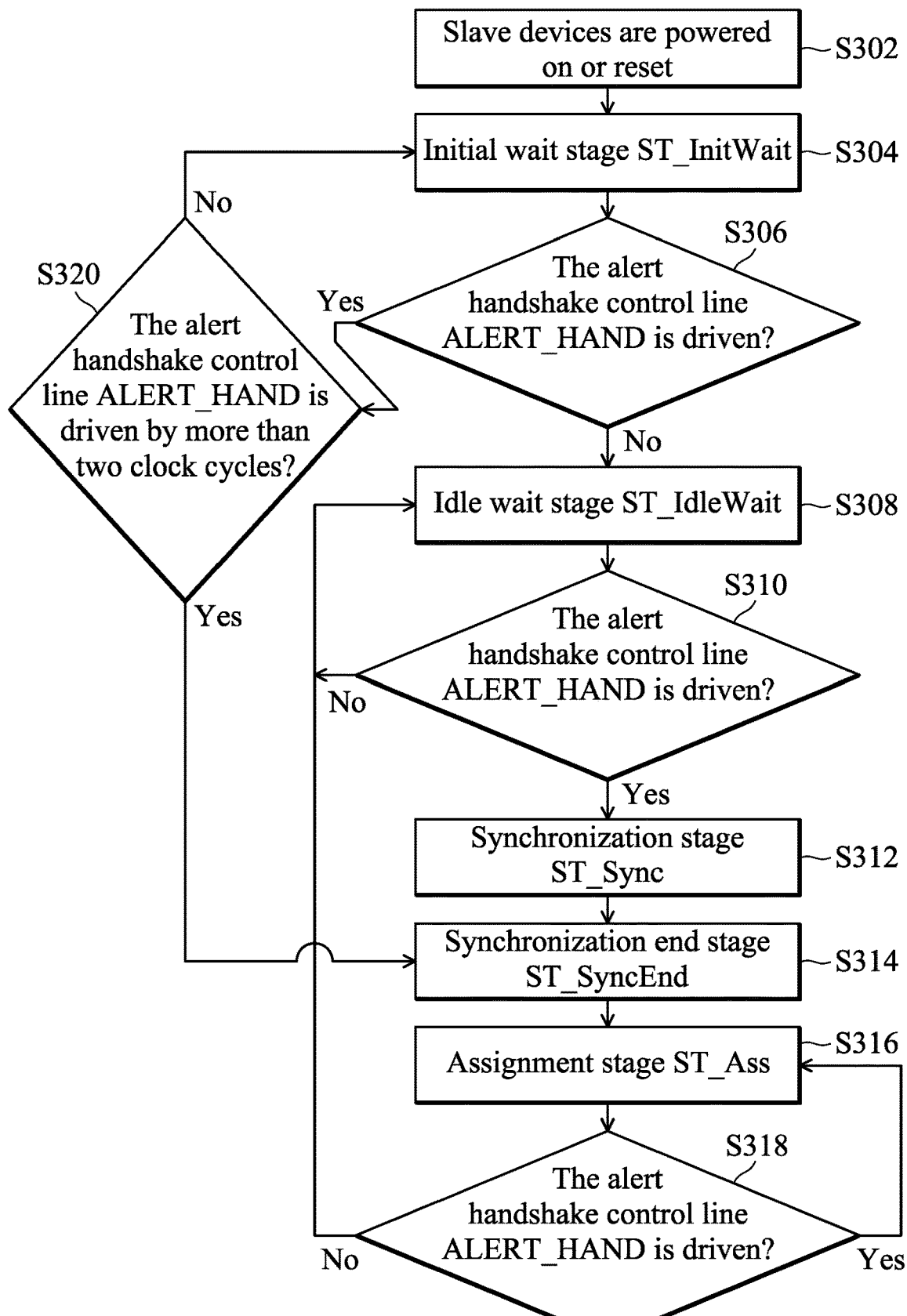
FIG. 3 is a flowchart of a scheduling control method via an alert handshake control line of an embodiment of a bus system of the present invention.
Figure 4:
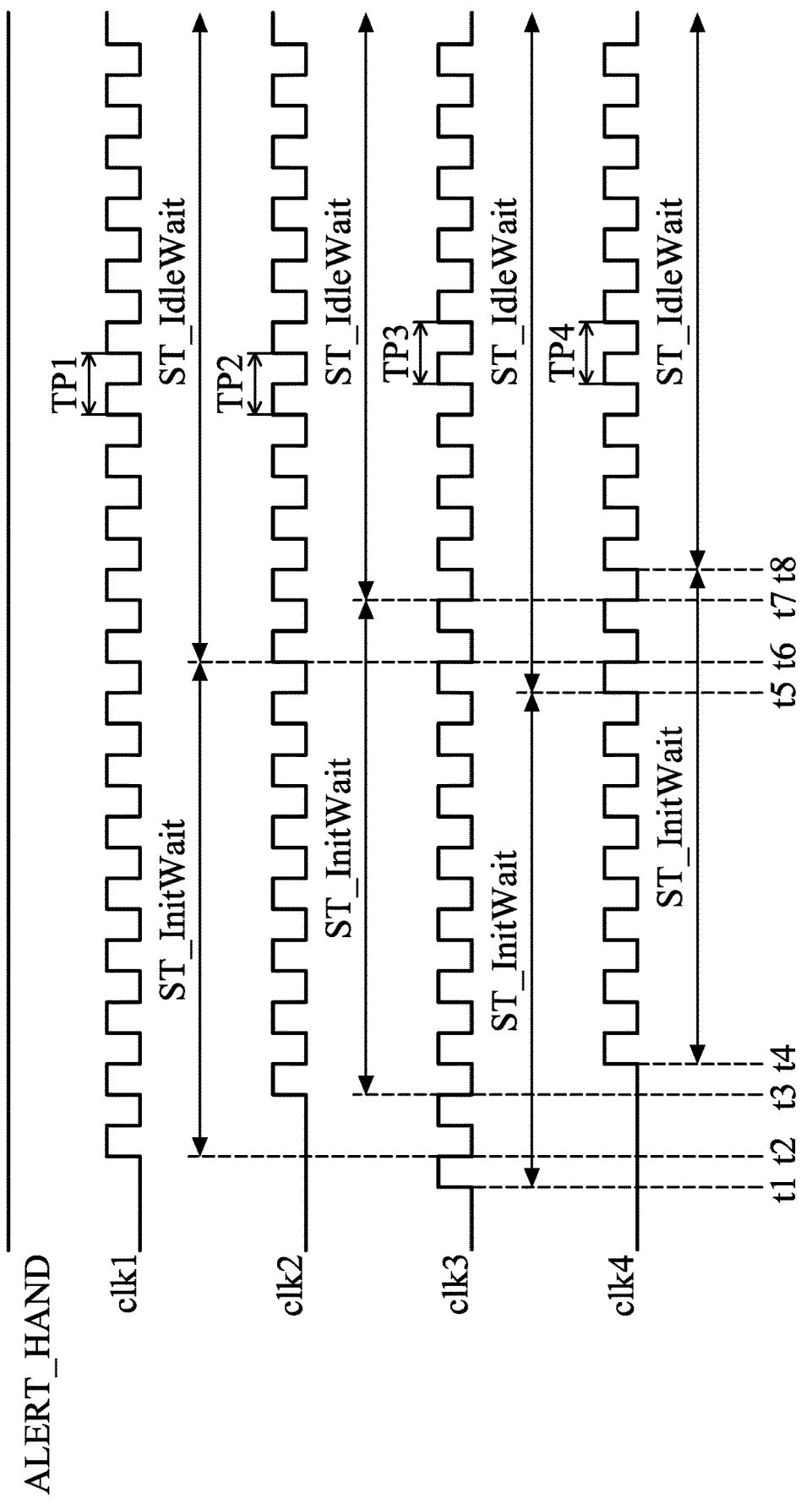
FIG. 4 shows an exemplary signal waveform diagram of an alert handshake control line and a clock signal in an initial wait stage and an idle wait stage when a plurality of slave devices executes a scheduling control method of FIG. 3, according to the present invention.

FIG. 3 is a flowchart of a scheduling control method of an embodiment of a bus system of the present invention. The scheduling control method shown in FIG. 3 can be executed by each of the scheduling controllers 145A to 145D of the slave devices 14A to 14D of the bus system 1. FIG. 4 shows an exemplary signal waveform diagram of the clock signals clk1 to clk4 and signals on the alert handshake control line ALERT_HAND of the slave devices 14A to 14D, to illustrate operations of an initial wait stage ST_InitWait and an idle wait stage ST_IdleWait of the scheduling control method of FIG. 3. Furthermore, the waveforms of the clock signals clk1 to clk4 and signals on the alert handshake control line ALERT_HAND shown in FIG. 4 are merely examples, and the present invention is not limited thereto.

Please refer to FIGS. 3 and 4. The slave devices 14A to 14D can use the clock signals clk1 to clk4 having the same frequency as the counting basis for the scheduling controllers 145A to 145D. In some embodiments, the clock signals clk1 to clk4 4 also have the same phases. In some embodiments, the clock signals clk1 to clk4 can have different phases. In some embodiments, the clock signals clk1 to clk4 can have the same frequencies, and the clock signals clk1 to clk4 have the same time period, that is, TP1=TP2=TP3=TP4. In some embodiments, the scheduling controllers 145A to 145D can perform the counting operations based on rising edges of the clock signals clk1 to clk4. In some embodiments, the scheduling controllers 145A to 145D can perform the counting operations based on falling edges of the clock signals clk1 to clk4.

First, when the slave devices 14A to 14D are powered on or reset in a step S302, the scheduling controllers 145A to 145D can control the slave devices 14A to 14D to enter the initial wait stage ST_InitWait in a step S304.

In the initial wait stage ST_InitWait, the scheduling controllers 145A to 145D of the slave devices 14A to 14D can control the alert handshake pins Alert_1 to Alert_4 corresponding thereto to enter an input mode. Therefore, in clock cycles of the corresponding clock signals clk1 to clk4, the scheduling controllers 145A to 145D can monitor or detect the voltage level of the alert handshake control line ALERT_HAND via the corresponding alert handshake pins Alert_1 to Alert_4, in a step S306. In some embodiments, each of the scheduling controllers 145A to 145D can detect, in 2×n clock cycles, whether the alert handshake control line ALERT_HAND is driven by any one of the slave devices 14A to 14D. For example, each of the scheduling controllers 145A to 145D can detect whether the alert handshake control line ALERT_HAND is changed from the high voltage level to the low voltage level, wherein n is a number of the slave devices 14A to 14D disposed in the bus system 1. For example, in FIG. 4, each of the scheduling controllers 145A to 145D can detect, in 2×4 clock cycle, whether the alert handshake control line ALERT_HAND is driven by any one of the slave devices 14A to 14D. When the alert handshake control line ALERT_HAND is driven, the slave devices 14A to 14D determine whether the number of the driven clock cycles exceeds a specific value, in a step S320. It should be noted that the number of the clock cycles shown in figures is merely as an example, and the present invention is not limited thereto.

In the initial wait stage ST_InitWait, when the slave devices 14A to 14D determine that the alert handshake control line ALERT_HAND is driven by clock cycles not exceeding two, in the step S320, the scheduling controllers 145A to 145D can control the slave devices 14A to 14D to enter the initial wait stage ST_InitWait again; otherwise, when the slave devices 14A to 14D determine that the alert handshake control line ALERT_HAND is driven by the clock cycles exceeding two, the scheduling controllers 145A to 145D can control the slave devices 14A to 14D to directly enter the synchronization end stage ST_SyncEnd in a step S314. An operation of the synchronization end stage ST_SyncEnd will be described in following paragraphs.

In the initial wait stage ST_InitWait, when the slave devices 14A to 14D determine that alert handshake control line ALERT_HAND is not driven, in a step S306, the scheduling controllers 145A to 145D can control the slave devices 14A to 14D to enter the idle wait stage ST_IdleWait, in a step S308. In the idle wait stage ST_IdleWait, the scheduling controllers 145A to 145D of the slave devices 14A to 14D can control the corresponding alert handshake pins Alert_1 to Alert_4 to enter the input mode, so as to facilitate to monitor whether the alert handshake control line ALERT_HAND is driven by one of the slave devices 14A to 14D, in a step S310. For example, the scheduling controllers 145A to 145D can monitor whether the alert handshake control line ALERT_HAND is changed from the high voltage level to the low voltage level.

As shown in FIG. 4, at a time point t1, the scheduling controller 145C of the slave device 14C controls the slave device 14C to enter the initial wait stage ST_InitWait. When continuously monitoring that the alert handshake control line ALERT_HAND is at the high voltage level, the scheduling controller 145C of the slave device 14C can control the slave device 14C to enter the idle wait stage ST_IdleWait at the time point t5. Similarly, at the time point t2, the scheduling controller 145A of the slave device 14A can control the slave device 14A to enter the initial wait stage ST_InitWait. When continuously monitoring that the alert handshake control line ALERT_HAND is at the high voltage level, the scheduling controller 145A of the slave device 14A can control the slave device 14A to enter the idle wait stage ST_IdleWait, at the time point t6. Furthermore, at a time point t3, the scheduling controller 145B of the slave device 14B can control the slave device 14B to enter the initial wait stage ST_InitWait. When continuously monitoring that the alert handshake control line ALERT_HAND is at the high voltage level, the scheduling controller 145B of the slave device 14B can control the slave device 14B to enter the idle wait stage ST_IdleWait, at the time point t7. Furthermore, at a time point t4, the scheduling controller 145D of the slave device 14D can control the slave device 14D to enter the initial wait stage ST_InitWait. When continuously monitoring that the alert handshake control line ALERT_HAND is at the high voltage level, the scheduling controller 145D of the slave device 14D can control the slave device 14D to enter the idle wait stage ST_IdleWait, at the time point t8.

As shown in FIG. 4, the time points where the slave devices 14A to 14D enter the initial wait stage ST_InitWait and the idle wait stage ST_IdleWait are different. In the embodiment, the slave devices 14A to 14D of the bus system 1 are disposed at different positions on a printed circuit board. When the power source of the bus system 1 is turned on or the bus system 1 is reset, different routings and configurations may make the slave devices 14A to 14D enter the initial wait stage ST_InitWait at the different time points.

Please refer back to FIG. 3, in step S310, when detecting that the alert handshake control line ALERT_HAND is not driven by any slave devices 14A to 14D, each of the plurality of scheduling controllers 145A to 145D can control the slave devices 14A to 14D to keep operating in the idle wait stage ST_IdleWait, in a step S308, until the alert handshake control line ALERT_HAND is driven in a step S310, for example, the alert handshake control line ALERT_HAND is at the low voltage level. When detecting that the alert handshake control line ALERT_HAND is driven, each of the plurality of scheduling controllers 145A to 145D can control the corresponding slave devices 14A to 14D to enter the synchronization stage ST_Sync, in a step S312. Therefore, the slave devices 14A to 14D of the bus system 1 can enter the synchronization stage ST_Sync at the same time.

Figure 5:
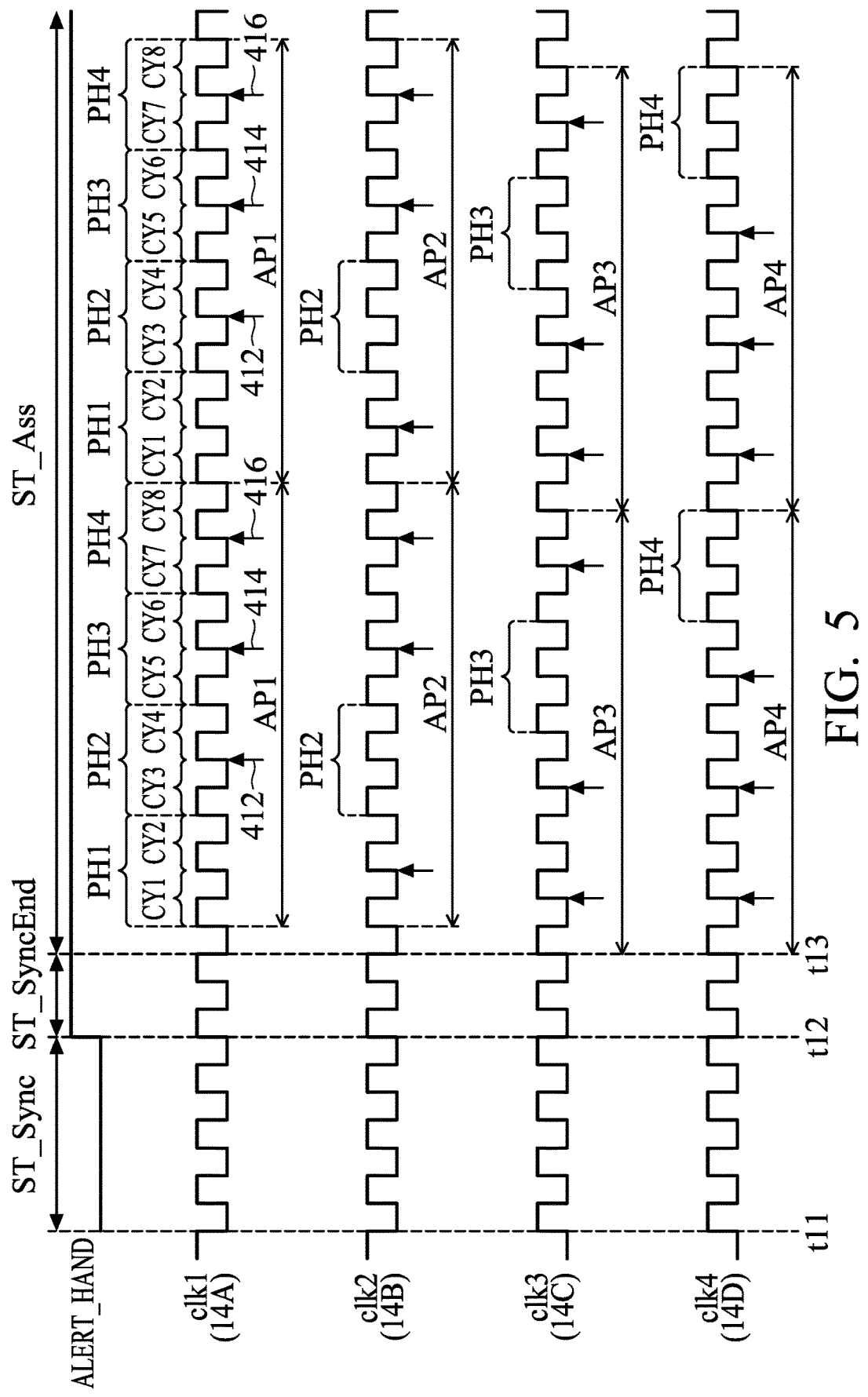
FIG. 5 shows an exemplary waveform diagram of a synchronization stage, a synchronization end stage and an assignment stage when a plurality of slave devices executes the scheduling control method of FIG. 3, according to the present invention.

FIG. 5 shows an exemplary waveform diagram of an alert handshake control line ALERT_HAND, for illustrating operations of the synchronization stage ST_Sync (the step S312), the synchronization end stage ST_SyncEnd (the step S314) and the assignment stage ST_Ass (step S316) of the scheduling control method of FIG. 3. Please refer to FIGS. 3 and 5, at the time point t11, after the bus system 1 enter the synchronization stage ST_Sync in the step S312, the slave device requesting an interrupt can control the alert handshake pin thereof to enter the output mode to output the low voltage level, so as to drive the alert handshake control line ALERT_HAND by clock cycles more than a specific number, such as more than three clock cycles, thereby facilitating other slave device of the bus system 1 to distinguish that the bus system 1 enters the synchronization stage ST_Sync rather than other phase such as assignment stage ST_Ass. At the time point t12, after the alert handshake control line ALERT_HAND is driven by more than three clock cycles, the slave device requesting the interrupt can stop driving the alert handshake control line ALERT_HAND, and then control the alert handshake pin thereof to enter the input mode, so as to monitor the alert handshake control line ALERT_HAND. At the same time, other slave devices of the bus system 1 can detect that the alert handshake control line ALERT_HAND is recovered as the high voltage level, so that all slave device can enter the synchronization end stage ST_SyncEnd, at the same time, in a step S314.

In the synchronization end stage ST_SyncEnd, each of the scheduling controllers 145A to 145D can wait at least one clock cycle, to ensure all of the slave devices 14A to 14D of the bus system 1 to complete the synchronization stage ST_Sync, and then the scheduling controllers 145A to 145D can control the slave devices 14A to 14D to enter the assignment stage ST_Ass from the synchronization end stage ST_SyncEnd, in a step S316. In the assignment stage ST_Ass, each of the plurality of slave devices 14A to 14D can monitor state of the alert handshake control line ALERT_HAND via the alert handshake pins Alert_1 to Alert_4 in each assignment period.

As shown in FIG. 5, the slave devices 14A to 14D have assignment periods AP1 to AP4 with the same time periods, respectively. In the embodiment, each of the assignment periods AP1 to AP4 have 2×4 clock cycles CY1 to CY8. Furthermore, each of assignment periods AP1 to AP4 can be divided into four phases PH1 to PH4, and each phase comprises two clock cycles. For example, the phase PH1 comprises clock cycles CY1 and CY2, the phases PH2 comprises clock cycles CY3 and CY4, the phase PH3 comprises clock cycles CY5 and CY6, and the phase PH4 comprises clock cycles CY7 and CY8.

In the assignment stage ST_Ass of FIG. 5, each of slave devices 14A to 14D can execute the corresponding operation thereof according to the phases PH1 to PH4. In the embodiment, the slave device 14A corresponds to the phase PH1, the slave device 14B corresponds to the phase PH2, the slave device 14C corresponds to the phase PH3, and the slave device 14D corresponds to the phase PH4. In some embodiments, the corresponding relationship between the slave devices 14A to 14D and the phases PH1 to PH4 is determined by the address section selection pins 18A to 18D and the address entry selection pins 16A to 16D shown in FIG. 2. In other implementations, the corresponding relationship between the slave devices 14A to 14D and the phases PH1 to PH4 can be determined by other hardware or software configurations.

As shown in FIG. 5, the slave devices 14A to 14D can count the clock cycles CY1 to CY8 of the assignment periods AP1 to AP4 according to rising edges of the clock signals clk1 to clk4 thereof. In the assignment stage ST_Ass, when the slave device 14A communicates with the master device 10, the slave device 14A has right to drive the alert handshake control line ALERT_HAND in the phase PH1 of the assignment period AP1 only. Particularly, when the slave device 14A communicates with the master device 10, the scheduling controller 145A of the slave device 14A can, in the phase PH1, control the alert handshake pin Alert_1 to enter the output mode, and output the low voltage level to drive the alert handshake control line ALERT_HAND, so as to control the alert handshake control line ALERT_HAND at the low voltage level. When the slave device 14A does not need to communicate with the master device 10, the scheduling controller 145A of the slave device 14A can, in the phase PH1, control the alert handshake pin Alert_1 to enter the input mode, and stop driving the alert handshake control line ALERT_HAND.

In the phases PH2 to PH4 of the assignment period AP1, the slave device 14A can monitor the voltage level of the alert handshake control line ALERT_HAND, for determining whether the master device 10 is in communication with the slave devices 14B to 14D. In the other words, in the phases PH2 to PH4, the scheduling controller 145A of the slave device 14A can control the alert handshake pin Alert_1 to enter the input mode. For example, in the assignment period AP1, the slave device 14A can monitor, at the phase PH2 as an arrowhead 412 shown in FIG. 5, the voltage level of the alert handshake control line ALERT_HAND via the alert handshake pin Alert_1, so as to determine whether the slave device 14B is in communication with the master device 10. If the slave device 14A detects that the alert handshake control line ALERT_HAND is at the high voltage level in the phase PH2, the scheduling controller 145A determines that the slave device 14B is not in communication with the plurality of master device 10. If the slave device 14A detects that the alert handshake control line ALERT_HAND is at the low voltage level in the phase PH2, the scheduling controller 145A can determine that the slave device 14B is communicating with the master device 10.

Similarly, in the assignment period AP1, the slave device 14A can monitor, at the phase PH3 as an arrowhead 414 shown in FIG. 5, the voltage level of the alert handshake control line ALERT_HAND via the alert handshake pin Alert_1, so as to determine whether the slave device 14C is in communication with the master device 10. If the slave device 14A detects that the alert handshake control line ALERT_HAND is at the high voltage level in the phase PH3, the scheduling controller 145A can determine that the slave device 14C is not in communication with the plurality of master device 10. If the slave device 14A detects that the alert handshake control line ALERT_HAND is at the low voltage level in the phase PH3 and at the high voltage level in the previous phase PH2, the scheduling controller 145A can determine that the slave device 14C is communicating with the master device 10.

As shown in FIG. 5, by monitoring other phases, each of slave devices 14A to 14D can determine which slave device is communicating with the master device 10. Furthermore, by monitoring the rising edge in middle of each phase, such as the rising edge (marked by an arrowhead 416) or the falling edge (not shown in FIG. 5) between the clock cycles CY7 and CY8, to prevent the time difference caused by a phase offset of the clock signals clk1 to clk4.

Please refer back to FIG. 3, in the assignment stage ST_Ass in the step S316, each of the slave devices 14A to 14D can monitor, via the alert handshake pins Alert_1 to Alert_4 in each assignment period AP, whether the alert handshake control line ALERT_HAND is driven. After the slave device driving the alert handshake control line ALERT_HAND completes the interrupt requirement thereof, the slave device stops driving the alert handshake control line ALERT_HAND. Next, when each of the slave devices 14A to 14D detects, via the corresponding alert handshake pin, that the alert handshake control line ALERT_HAND is not driven in a step S318, the scheduling controllers 145A to 145D can control the slave devices 14A to 14D to enter the idle wait stage ST_IdleWait again in a step S308. Particularly, in each assignment period AP, only one of the slave devices 14A to 14D is permitted to drive the alert handshake control line ALERT_HAND.

In some embodiments, when the alert handshake control line ALERT_HAND is driven by more than two clock cycles, it indicates that one of the slave devices is executing the synchronization stage ST_Sync, so the other slave devices return to the synchronization stage ST_Sync.

Figure 6:
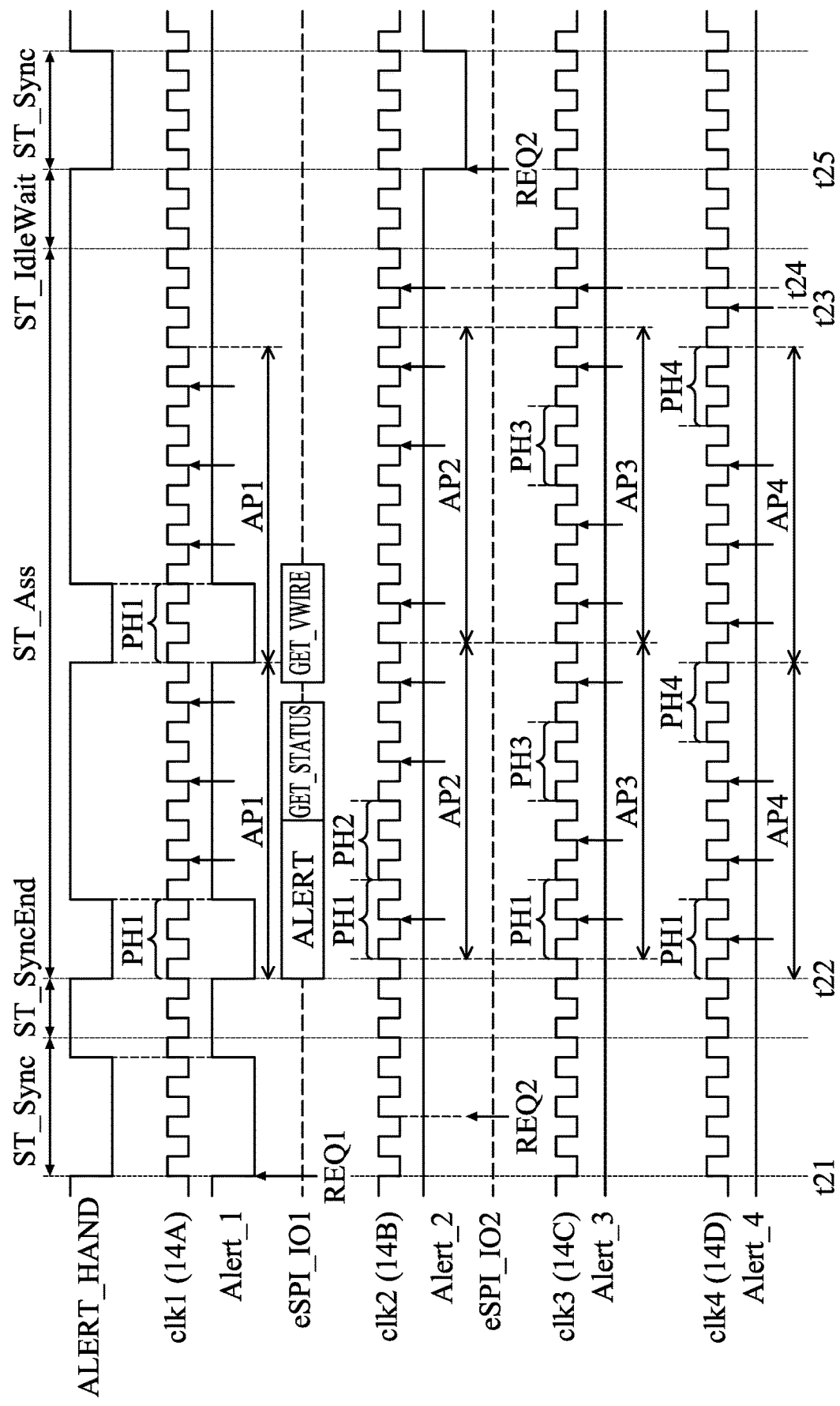
FIG. 6 shows an exemplary waveform diagram of operation of a plurality of slave devices executing the scheduling control method of FIG. 3 to drive an alert handshake control line, according to the present invention.

FIG. 6 shows a waveform diagram of signal on the alert handshake control line ALERT_HAND, for illustrating an operation of the slave devices 14A to 14D driving the alert handshake control line ALERT_HAND according to the scheduling control method of FIG. 3. As shown in FIG. 6, in response to an interrupt requirement REQ1, the slave device 14A requests to communicate with the master device 10. In order to communicate with the master device 10, the slave device 14A can monitor the voltage level of the alert handshake control line ALERT_HAND first, to make sure that the alert handshake control line ALERT_HAND is not driven by the slave devices 14B to 14D. Next, at the time point t21, the slave device 14A can control the alert handshake pin Alert_1 to enter the output mode and output the low-voltage-level signal within three clock cycles of the clock signal clk1, so as to drive the alert handshake control line ALERT_HAND for notifying the slave devices 14B and 14D to enter the synchronization stage ST_Sync. Since the bus system 1 is operating in the synchronization stage ST_Sync, even if the slave device 14B generates an interrupt requirement REQ2, the slave device 14B cannot drive the alert handshake control line ALERT_HAND. After completing the synchronization stage ST_Sync, the slave device 14A can control the alert handshake pin Alert_1 to enter the input mode and stop driving the alert handshake control line ALERT_HAND. As a result, each of the plurality of slave devices 14A to 14D of the bus system 1 enter the synchronization end stage ST_SyncEnd. As mentioned previously, in the synchronization end stage ST_SyncEnd, the scheduling controllers 145A to 145D can wait at least one clock cycle, and then control the slave devices 14A to 14D to enter the assignment stage ST_Ass from the synchronization end stage ST_SyncEnd.

In the assignment stage ST_Ass, the slave device 14A can get the right to control the alert handshake control line ALERT_HAND, for communicating with the master device 10. At the time point t22, the alert handshake control line ALERT_HAND is changed to the low voltage level in the phase PH1 of the assignment period AP1 of the slave device 14A. Therefore, the slave device 14A can get the right to communicate with the master device 10. Next, the slave device 14D can detect, in the phase PH1 of the assignment period AP4, that the alert handshake control line ALERT_HAND is at the low voltage level. The slave device 14D can detect that the slave device 14A corresponding to the phase PH1 is communicating with the master device 10, for example, for processing the interrupt requirement. Next, the slave device 14B can detect, in the phase PH1 of the assignment period AP2, that the alert handshake control line ALERT_HAND is at the low voltage level. The slave device 14B can determine that the slave device 14A corresponding to the phase PH1 is communicating with the master device 10. At the same time, the slave device 14C can detect, in the phase PH1 of each assignment period AP3, that the alert handshake control line ALERT_HAND is at the low voltage level. The slave device 14C can determine that the slave device 14A corresponding to the phase PH1 is processing the interrupt requirement.

When the slave device 14A is in communication with the master device 10, the slave device 14A can provide an event alert signal ALERT to the input/output signal line eSPI_IO of the bus 12 via the input/output signal line eSPI_IO1, so as to transmit the event alert signal ALERT to the master device 10. The event alert signal ALERT can indicate the request signal of the slave device 14A for communication with the master device 10. When detecting the slave device 14A drives the alert handshake control line ALERT_HAND, one of slave devices 14B to 14D, which wants to communicate with the master device 10, can store the event message and then wait for getting the control right of the alert handshake control line ALERT_HAND to communicate with the master device 10.

In response to the event alert signal ALERT, the master device 10 transmits a status-retrieving signal GET_STATUS via the input/output signal line eSPI_IO, to query states of the slave devices 14A to 14D. At this time, the slave device 14A receives the status-retrieving signal GET_STATUS via the input/output signal line eSPI_IO, and then respond to notice the master device 10 that there is information to be transmitted. At this time, the slave devices 14B to 14D do not receive and respond the status-retrieving signal GET_STATUS. Next, the master device 10 transmits the event-retrieving signal GET_VWIRE via the input/output signal line eSPI_IO, for obtaining the event message of the slave device 14A. Next, the slave device 14A receives and responds the event-retrieving signal GET_VWIRE, to transmit the event message to the master device 10. The slave devices 14B to 14D does not receive and respond the event-retrieving signal GET_VWIRE.

When the slave device 14A communicates with the master device 10, the slave device 14A can drive the alert handshake control line ALERT_HAND in the phase PH1 of each assignment period AP1 until the slave device 14A ends the communication with the master device 10.

At the time point t23, the slave device 14D can detect, in the phase PH1 of the assignment period AP4, that the alert handshake control line ALERT_HAND is changed to the high voltage level. The slave device 14D can determine that the slave device 14A corresponding to the phase PH1 ends the communication with the master device 10. Next, at the time point t24, the slave device 14B and 14C can detect, in the phases PH1 of the assignment periods AP2 and AP3 respectively, that the alert handshake control line ALERT_HAND is changed to the high voltage level. The slave device 14B and 14C can determine that the slave device 14A corresponding to the phase PH1 ends the communication with the master device 10. Next, the scheduling controllers 145B to 145D can control the slave devices 14B to 14D to enter the idle wait stage ST_IdleWait. In the other words, after the slave device 14A ends the communication with the master device 10, the slave device 14A does not drive the alert handshake control line ALERT_HAND in the phase PH1 of the assignment period AP1, so that the slave devices 14A to 14D can enter the idle wait stage ST_IdleWait after the phase PH1. As mentioned previously, in the idle wait stage ST_IdleWait, the scheduling controllers 145A to 145D of the slave devices 14A to 14D can control the corresponding alert handshake pins Alert_1 to Alert_4 to enter the input mode, so as to monitor whether the alert handshake control line ALERT_HAND is driven by any one of the slave devices 14A to 14D.

At the time point t25, when the slave device 14B has the interrupt requirement REQ2, the slave device 14B can control the alert handshake pin Alert_2 to enter the output mode and output the low voltage level within three clock cycles of the clock signal clk2, to drive the alert handshake control line ALERT_HAND, to notice the slave devices 14A, 14C and 14D to enter the synchronization stage ST_Sync. Next, the bus system 1 enters the synchronization end stage ST_SyncEnd and the assignment stage ST_Ass, in a sequential order. As mentioned previously, in the assignment stage ST_Ass, the slave device 14B can control the alert handshake pin Alert_2, in the phase PH2 corresponding to the slave device 14B, to enter the output mode and output the low voltage level, so as to drive the alert handshake control line ALERT_HAND, and perform further communication.

In a conventional bus system, when the slave devices are operated in the assignment stage ST_Ass for a long time, an accumulated offset (such as frequency or phase) between the clock signals of the slave devices may easily cause scheduling error or collision. According to an embodiment, every time the interrupt requirement occurs, the scheduling controller can control all slave devices to enter the synchronization stage ST_Sync again, so as to prevent the bus system from continuously operating in the assignment stage ST_Ass, thereby resetting the offset between the clock signals of all slave devices to zero. In the other words, in each assignment stage ST_Ass, the slave devices do not count different time periods, so as to prevent the scheduling error or collision. Furthermore, in the assignment stage ST_Ass, the scheduling controller can monitor, in each assignment period, the voltage levels of the alert handshake control line ALERT_HAND in other phases other than the phase thereof, so that the scheduling controller can determine which slave device is currently communicating with the master device. The bus system can allow the user to identify or a developer to debug more quickly. Furthermore, in the assignment period, since each slave device corresponds to a phase, the interrupt requirements of different slave devices can occur at different time points, so as to prevent the slave devices from snatching the alert handshake control line ALERT_HAND to cause the master device to communicate with incorrect slave device. Furthermore, the pin (such as the address section selection pin and the address entry selection pin) of the slave device can be used to set the corresponding phase without adding more pins.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A bus system, comprising:
   a master device;
   a bus; and
   a plurality of slave devices electrically connected to the master device via the bus;
   wherein each of the plurality of slave devices comprises an alert handshake pin, and the alert handshake pins of the plurality of slave devices are electrically connected with each other via an alert handshake control line;
   wherein when the alert handshake control line is at a first voltage level and a first slave device of the plurality of slave devices wants to communicate with the master device via the bus, the first slave device controls the alert handshake control line to be at a second voltage level via the alert handshake pin, to make the plurality of slave devices enter a synchronization stage;
   wherein when the first slave device is in in an assignment stage and in communication with the master device via the bus, in a first phase of phases of each assignment period of the assignment stage corresponding to the first slave device, the first slave device controls the alert handshake control line to be at the second voltage level via the alert handshake pin, and the first slave device controls the alert handshake control line to be at the first voltage level via the alert handshake pin in the phases other than the first phase in the assignment period;

wherein a number of clock cycles of each of the phases is less than a number of the clock cycles of the assignment stage, wherein once the first slave device controls the alert handshake control line to the second voltage level via the alert handshake pin in the synchronization stage, other slave device that wants to communicate with the master device is inhibited to control the alert handshake control line in the synchronization stage and the assignment stage.

2. The bus system according to claim 1, wherein in the phase other than the first phase in each assignment period, the first slave device detects the voltage level of the alert handshake control line to determine whether the master device is in communication with one of the plurality of slave devices.

3. The bus system according to claim 2, wherein when a second slave device of the slave device detects, in the first phase of each assignment period, that the alert handshake control line is at the second voltage level, the second slave device determines that the master device is communicating with the first slave device.

4. The bus system according to claim 3, wherein when the second slave device detects that the alert handshake control line is at the first voltage level in the phases of each assignment period, the second slave device determines that the master device is not in communication with the plurality of slave device.

5. The bus system according to claim 1, wherein in a synchronization end stage between the synchronization stage and the assignment stage, the first slave device controls the alert handshake control line to be at the first voltage level via the alert handshake pin, wherein a number of clock cycles of the synchronization end stage is less than a number of clock cycles of each of the phases by at least one clock cycle.

6. The bus system according to claim 1, wherein in each assignment period, a number of the phases is equal to a number of the plurality of slave devices.

7. The bus system according to claim 1, further comprising:
a pull-up resistor coupled to the alert handshake control line;
wherein the second voltage level is a low voltage level, and the first voltage level is a high voltage level.

8. A bus system, comprising:
a master device;
a bus; and
a plurality of slave devices electrically connected to the master device via the bus;

wherein each of the plurality of slave devices comprises an alert handshake pin, and the alert handshake pins of the plurality of slave devices are electrically connected to a pull-up resistor via an alert handshake control line;

wherein when the alert handshake control line is at a first voltage level and a first slave device of the plurality of slave devices wants to communicate with the master device via the bus, the first slave device controls the alert handshake control line to be at a second voltage level via the alert handshake pin, so as to make the plurality of slave devices enter a synchronization stage;

wherein each of plurality of slave devices detects the voltage level of the alert handshake control line in phases of each assignment period of an assignment stage other than the phase corresponding thereto, so as to determine whether the master device is in communication with one of the plurality of slave devices;

wherein in each assignment period, a number of the phases is equal to a number of the plurality of slave devices, wherein once the first slave device controls the alert handshake control line to the second voltage level via the alert handshake pin in the synchronization stage, other slave device that wants to communicate with the master device is inhibited to control the alert handshake control line in the synchronization stage and the assignment stage.

9. The bus system according to claim 8, wherein when the first slave device is in communication with the master device via the bus, the first slave device drives the alert handshake control line via the alert handshake pin in a first phase corresponding to the first slave device in each assignment period, to make the alert handshake control line at the second voltage level, so as to notice the other of the plurality of slave devices that the master device is in communication with the first slave device.

10. The bus system according to claim 9, wherein in the phases other than the first phase of each assignment period, the alert handshake control line is at the first voltage level, and each of the phases comprise two clock cycles;

wherein in a synchronization end stage between the synchronization stage and the assignment stage, the first slave device controls the alert handshake control line to be at the first voltage level via the alert handshake pin, wherein a number of clock cycles of the synchronization stage is less than a number of clock cycles of each of the phases.

* * * * *